UNITED STATES PATENT OFFICE.

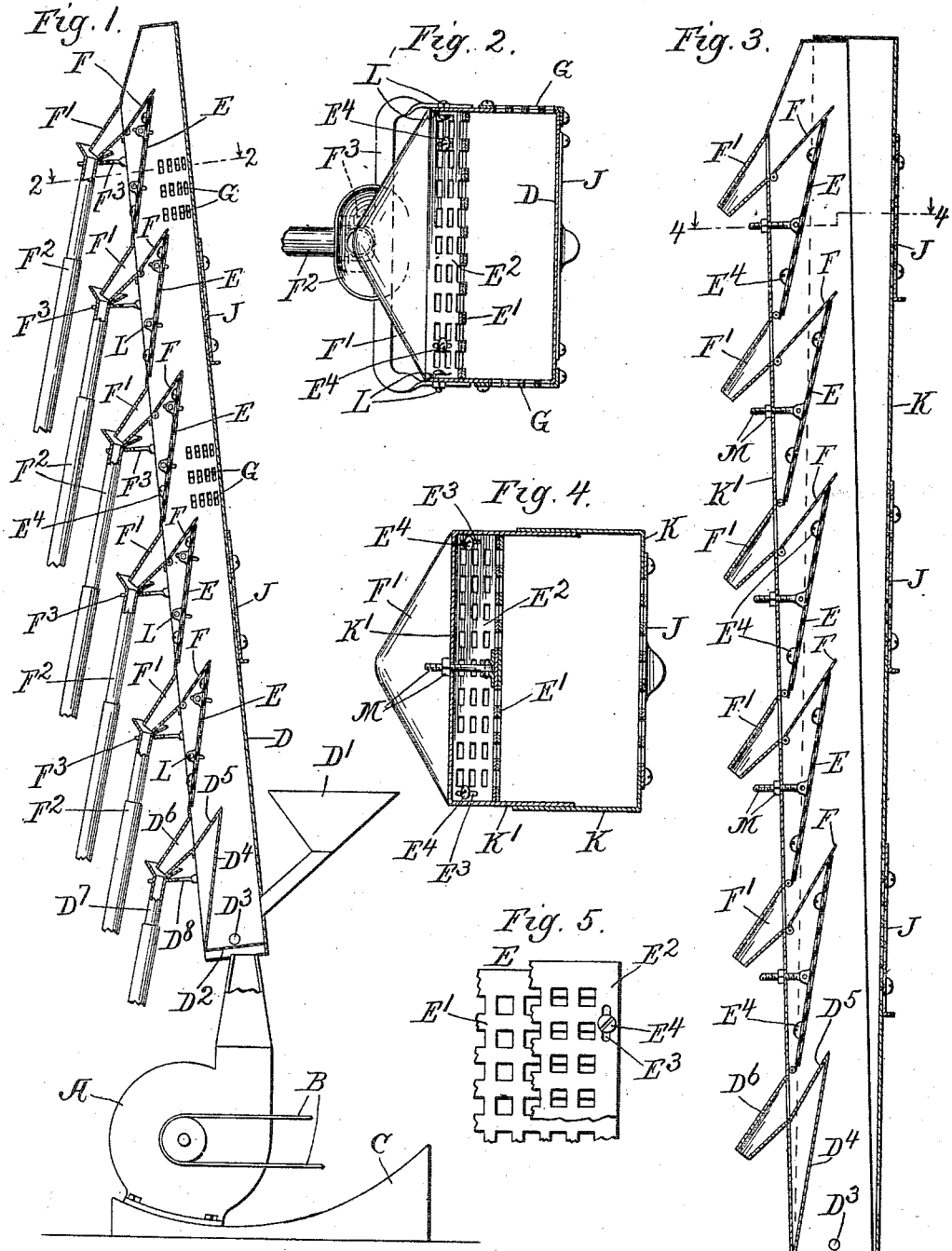

AXEL T. HEDFELDT, OF CHICAGO, ILLINOIS, ASSIGNOR TO HEDFELDT COMPANY, A CORPORATION OF ILLINOIS.

CLEANING AND SEPARATING MACHINE.

971,608.  Specification of Letters Patent.  Patented Oct. 4, 1910.

Application filed August 22, 1903. Serial No. 170,403.

*To all whom it may concern:*

Be it known that I, AXEL T. HEDFELDT, a citizen of the United States, residing at Chicago, in the county of Cook and State of Illinois, have invented a certain new and useful Improvement in Cleaning and Separating Machines, of which the following is a specification.

My invention relates to devices for use in connection with machines for cleaning or sorting coffee or other granular materials.

It has particular reference to the chute through which the material to be cleaned or sorted is passed.

My drawings are to be taken as diagrammatic in a sense and are intended merely to illustrate the ideas and show only such portions as may be necessary to enable a mechanic therefrom to complete the entire machine.

Figure 1 is a side elevation, with parts shown in section, of my chute and its associated parts; Fig. 2 is a cross section on line 2—2, Fig. 1; Fig. 3 is a vertical section of the chute; Fig. 4 is a cross section on line 4—4, Fig. 3; Fig. 5 is an enlarged detail of one of the screens.

Like parts are indicated by the same letter in all the figures.

A is a fan or blower, which may be driven from the belt B and may be movably mounted on the base C, so that its position can be changed to cause it if desired to discharge directly into the chute D. This chute may be supported in any desired manner so as to be fixed or movable as may be required.

$D^1$ is a funnel or pipe, by which the material to be cleaned or sorted is discharged into the bottom of the chute. The bottom of the chute may be closed by the screen $D^2$, through which the air blast enters, and the chute may be pivotally mounted on the cross bar $D^3$. The chute consists of three sides, with one side open, as indicated in the cross section of Fig. 2. The three sides are of any desired shape, form and proportion and may be made of sheet metal.

$D^4$ is an upwardly projecting and inwardly inclined plate at the lower open side of the chute and it is provided with a downwardly inclined portion $D^5$ at its upper end, which connects with an outwardly opening funnel or passage-way $D^6$, which discharges into the pipe $D^7$ supported upon the arm $D^8$ and discharges into some suitable receptacle.

E E are a series of screens, preferably composed of the two parts $E^1$ $E^2$, each perforated and adjustably connected together by means of the slot $E^3$ and set screw $E^4$, whereby such screens may be closed or their apertures made of any desired size within reasonable limits.

F F are a series of screens. These may be plain screens or they may be similar to the screens E E. Each leads to the outwardly opening funnel or discharge passage-way $F^1$, each of which opens into a pipe $F^2$. Each pipe is held by an arm $F^3$ and each pipe discharges into some suitable receptacle.

I have shown the screens E and F, as suggested, in a diagrammatic manner, but they may be movable so as to vary the distance between the forward wall of the chute and the upper edge of such screen E, when the parts are in position for operation.

Associated with each of the discharge funnels $F^1$ may be in the sides of the chute a screen G. I have shown but two of these. They may be dispensed with in some cases, or they may be associated with each funnel. J J are like screens in the forward side of the chute, in like manner associated with the funnels $F^1$ $F^1$. In the modification, the side screens G G are omitted and I have shown fewer details. The chute proper is varied and in effect consists of two three-sided troughs, which are preferably secured together at the bottom and are capable of being adjusted with reference to each other at the top, so as to vary the cross sectional area of the chute from the top toward the bottom, as indicated in Fig. 3. One of these troughs I have indicated by the letter K and the other by the letter $K^1$ and in Fig. 4 it is shown that one is fitted within the other. The screens E are secured to the sides of the trough, as shown in Figs. 1 and 2, by the bolts and lugs L, while the screens E, as shown in Figs. 3 and 4, are secured by the bolt and nut M in connection with the trough portion $K^1$. As previously stated, all these details can be greatly varied without departing from the spirit of my invention, and some may be used, while others are omitted. These things will be determined somewhat by the character of the rest of the machine and by the nature of the material to be treated. The essential features of the invention, however, are here shown.

The use and operation of my invention are as follows: The material of any kind or description, which it is desired to sort or clean, can be introduced into the lower part of the chute in any desired manner. I will assume that the apparatus is being used in connection with the cleaning or sorting of coffee and that the latter is introduced into the bottom of the chute on a screen. The operation of the air blast is to force the entire body of this material upwardly through the chute, which may be placed at any desired inclination. As the blast of air and its burden of material proceeds upwardly, the pressure of the air is reduced by the openings through the screens, or by the screened open rear portion of the chute, or by the increasing cross section of the chute, or by two or more of these features combined, or by the substitution of their equivalents. As soon as the blast of air with its load of material gets above the plate $D^4$, for example, the pressure is reduced by the enlargement of the effective cross sectional area of the chute, or by the escape of some of the air through some of the screens. Thus, if the rear side of the chute is closed, as shown in Fig. 3, then the screen J should be open somewhat. By the use of all of these several screens, a suitable variation in the pressure of the air can be obtained, so that at successive intervals along the chute particles of a certain weight will fall downwardly and be discharged through their appropriate funnels and pipes. Thus, for example, from coffee, stones and the like can be discharged through the first funnel $D^6$ and the coffee grains of increasing density successively through the funnels $F^1 F^1$, until the remaining material is discharged into the upper funnel. Obviously there may be any number of these funnels and associated pipes. The screens G and J, if used, can be placed in any desired position, as the case may require, and they are made adjustable so as to suit the different conditions.

I have spoken of the pressure of the air and I wish to be understood as using this term in a broad sense and having reference also to the fact that the rapidity of the current of the air varies with the pressure.

I claim:

1. In a device for sorting material, the combination of a straight air chute inclined from the vertical, with a perforated or screen like diaphragm across and near to its lower end, said diaphragm adapted to permit the passage of air and to prevent the passage of any of the material in a direction contrary to that of the air current, an air blast device discharging below and through such diaphragm and into the chute so that the draft of air is strongest at the lower end of the chute, means for conveying the material onto the diaphragm so that the particles thereof will be carried up by the air blast to altitudes proportioned inversely to the weight of such particles, and a series of discharge apertures arranged at intervals along the lower side of the chute to receive such material as the blast becomes spent the chute being narrowed immediately below each of such apertures.

2. In a device for sorting material, the combination of a straight air chute inclined from the vertical, with a perforated or screen like diaphragm across and near to its lower end, said diaphragm adapted to permit the passage of air and to prevent the passage of any of the material in a direction contrary to that of the air current, an air blast device discharging below and through such diaphragm and into the chute so that the draft of air is strongest at the lower end of the chute, means for conveying the material onto the diaphragm so that the particles thereof will be carried up by the air blast to altitudes proportioned inversely to the weight of such particles, a series of discharge apertures arranged at intervals along the lower side of the chute to receive such material as the blast becomes spent, and beneath each of said discharge apertures a projecting part adapted to intercept the material and convey the same through such discharge apertures.

3. In a device for sorting material, the combination of a straight air chute inclined from the vertical, with a perforated or screen like diaphragm across and near to its lower end, said diaphragm adapted to permit the passage of air and to prevent the passage of any of the material in a direction contrary to that of the air current, an air blast device discharging below and through such diaphragm and into the chute so that the draft of air is strongest at the lower end of the chute, means for conveying the material onto the diaphragm so that the particles thereof will be carried up by the air blast to altitudes proportioned inversely to the weight of such particles, a series of discharge apertures arranged at intervals along the lower side of the chute to receive such material as the blast becomes spent, the wall of the side of the chute having the discharge apertures, being formed with a series of inward projections below each of said apertures and slanting toward the same.

4. In a device for sorting material, the combination of a straight air chute inclined from the vertical, with a perforated or screen like diaphragm across and near to its lower end, said diaphragm adapted to permit the passage of air and to prevent the passage of any of the material in a direction contrary to that of the air current, an air blast device discharging below and through such diaphragm and into the chute, means for conveying the material onto the diaphragm so that the particles thereof will be carried up by the air blast to altitudes proportioned inversely to the weight of such particles, and a series of discharge apertures arranged at intervals along the lower side of the chute to receive such material as the blast becomes spent, the wall of the side of the chute having discharge apertures, being formed with a series of inward projections made of screen like material, below each of such apertures and slanting toward the same.

5. In a device for sorting material, the combination of a straight inclined chute with the upper side thereof relatively straight and uninterrupted, and the under side composed of a series of discharge spouts and of inwardly and upwardly projecting devices between such spouts, a perforated or screen like diaphragm across the lower end of such chute, said diaphragm adapted to permit the passage of air and to prevent the passage of any of the material in a direction contrary to that of the air current, means for depositing the material to be sorted upon such diaphragm, and an air blast device discharging from beneath the diaphragm into the chute so as to carry substantially all of the material sorted upward.

6. In a device for sorting material, the combination of a chute having a constant angle of inclination the upper side thereof relatively straight and uninterrupted and the under side composed of a series of discharge spouts and of inwardly and upwardly projecting devices between such spouts, a perforated diaphragm across the lower end of such chute, said diaphragm adapted to permit the passage of air and to prevent the passage of any solid material, means for depositing the material to be sorted upon such diaphragm, an air blast device discharging from beneath the diaphragm into the chute so as to carry substantially all of the material sorted upward.

AXEL T. HEDFELDT.

Witnesses:
HOMER L. KRAFT,
FANNY B. FAY.